US010260032B1

(12) United States Patent
Karasch

(10) Patent No.: US 10,260,032 B1
(45) Date of Patent: *Apr. 16, 2019

(54) APPARATUS AND METHOD FOR AGING LIQUIDS

(71) Applicant: Russell D. Karasch, Osage, MN (US)

(72) Inventor: Russell D. Karasch, Osage, MN (US)

(*) Notice: Subject to any disclaimer, the term of this patent is extended or adjusted under 35 U.S.C. 154(b) by 66 days.

This patent is subject to a terminal disclaimer.

(21) Appl. No.: 14/757,222

(22) Filed: Dec. 8, 2015

(51) Int. Cl.
C12H 1/22 (2006.01)
C12G 3/07 (2006.01)
B27H 5/08 (2006.01)

(52) U.S. Cl.
CPC ............... *C12H 1/22* (2013.01); *B27H 5/08* (2013.01); *C12G 3/065* (2013.01)

(58) Field of Classification Search
CPC . C12G 3/065; C12G 1/02; C12G 3/06; C12G 3/085; C12G 3/12; C12H 1/22; C12H 1/12; C12H 1/165; C12H 1/063; B27H 5/00; B27H 5/02; B27H 5/08
See application file for complete search history.

(56) References Cited

U.S. PATENT DOCUMENTS

| | | |
|---|---|---|
| 273,860 A | 3/1883 | Lachenmeyer |
| 334,222 A | 1/1886 | Fitch |
| 429,826 A | 6/1890 | Wagoner |
| 818,478 A | 4/1906 | Shwayder |
| 1,919,091 A | 10/1934 | Pritchett |
| 2,017,235 A | 10/1935 | Drew |
| 2,064,330 A | 12/1936 | Yocum |
| 2,079,378 A | 5/1937 | Mills |
| 2,086,073 A | 7/1937 | Francescon |
| 2,105,693 A | 1/1938 | Jones et al. |
| 2,108,661 A | 2/1938 | Farrier |
| 2,114,009 A | 4/1938 | Ramsay |
| 2,195,662 A | 4/1940 | Van Sant |
| 2,203,229 A | 6/1940 | Nilsson et al. |
| 2,289,245 A | 7/1942 | Dant |
| 2,487,594 A | 11/1949 | Rudnick |
| 2,876,692 A | 3/1959 | Gaisman |
| 3,372,633 A | 3/1968 | Horlander, Jr. |
| 3,842,723 A | 10/1974 | Boucher |
| 3,942,423 A | 3/1976 | Herzfeld |
| 4,173,656 A | 11/1979 | Duggins |
| 4,322,446 A | 3/1982 | Heess et al. |
| 4,558,639 A | 12/1985 | Hojnoski |

(Continued)

OTHER PUBLICATIONS

Fine Northern Oak website: www.finenorthernoak.com.

*Primary Examiner* — Hong T Yoo
(74) *Attorney, Agent, or Firm* — Gregor N. Neff

(57) ABSTRACT

Arrays of closely-spaced holes or cross-grain grooves are formed on the inside surfaces of the staves of a barrel, and/or on an elongated wooden member to greatly increase the amount of end grain wood exposed to the liquid and thereby increase the rate of aging the liquid. The holes and grooves in the staves extend only pa.it-way through the wood in order to maintain the structural integrity of the staves. The amount of end grain wood exposed is selected to produce the desired degree of aging in the desired amount of time. Used barrels can be reconstructed by cutting grooves in the inside surface of the barrel's side wall to expose new end grain wood To produce aging during re-use of the barrel.

8 Claims, 2 Drawing Sheets

(56) References Cited

U.S. PATENT DOCUMENTS

| | | |
|---|---|---|
| 4,827,994 A | 5/1989 | Whitford |
| 5,054,381 A | 10/1991 | DePeaux et al. |
| 5,102,675 A | 4/1992 | Howell et al. |
| 5,174,461 A | 12/1992 | Sullivan |
| 5,481,960 A | 1/1996 | Sullivan |
| 5,537,913 A | 7/1996 | Vowles |
| D372,624 S | 8/1996 | Chein |
| 5,647,268 A | 7/1997 | Sullivan |
| D422,678 S | 4/2000 | King |
| 6,203,836 B1 | 3/2001 | Gross, II et al. |
| 6,378,419 B1 | 4/2002 | Ecklein |
| D476,058 S | 6/2003 | Norton |
| D506,109 S | 6/2005 | Deal et al. |
| 6,966,250 B2 | 11/2005 | Eustis |
| 7,357,069 B1 | 4/2008 | Karasch et al. |
| D584,564 S | 1/2009 | Karasch |
| 7,594,468 B2 | 9/2009 | Kania et al. |
| 7,866,254 B1 | 1/2011 | Karasch et al. |
| 8,889,206 B2 | 11/2014 | Lix |
| 9,212,343 B1 * | 12/2015 | Karasch .................. C12H 1/22 |
| 2003/0157216 A1 | 8/2003 | Plumb |
| 2005/0031760 A1 | 2/2005 | Plumb |
| 2010/0025396 A1 * | 2/2010 | Boake .................... B65D 15/16 220/4.09 |

* cited by examiner

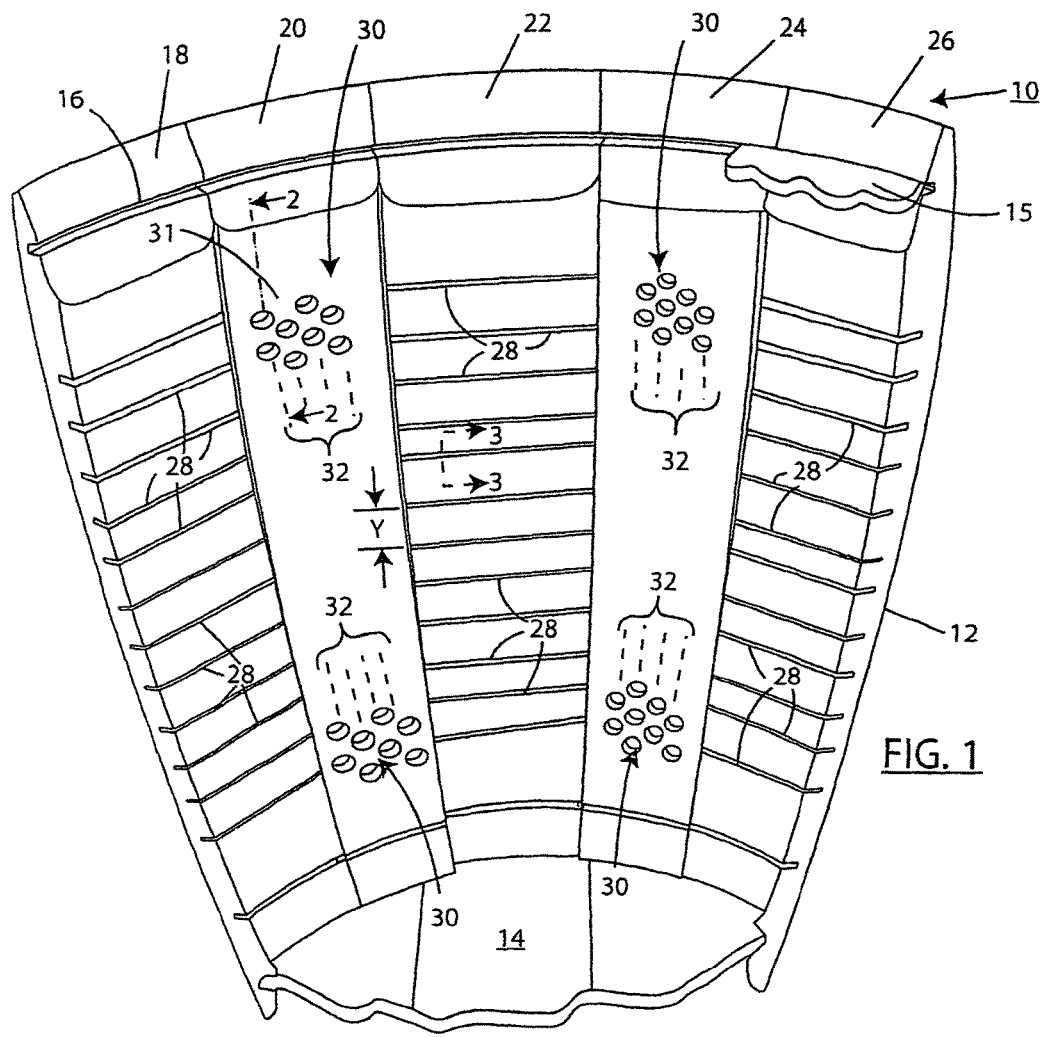
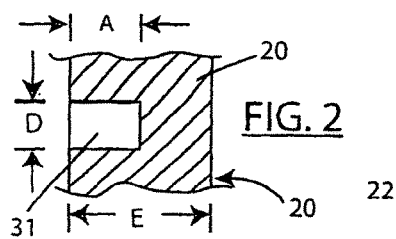
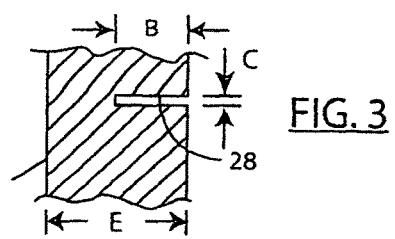

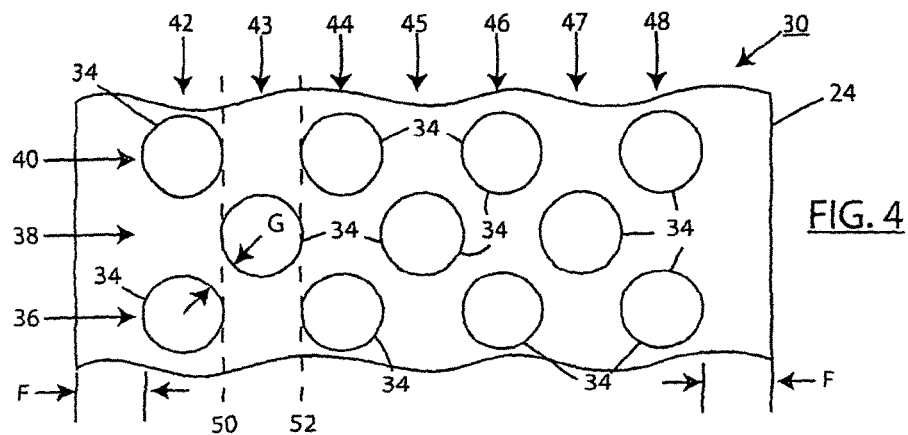
FIG. 4
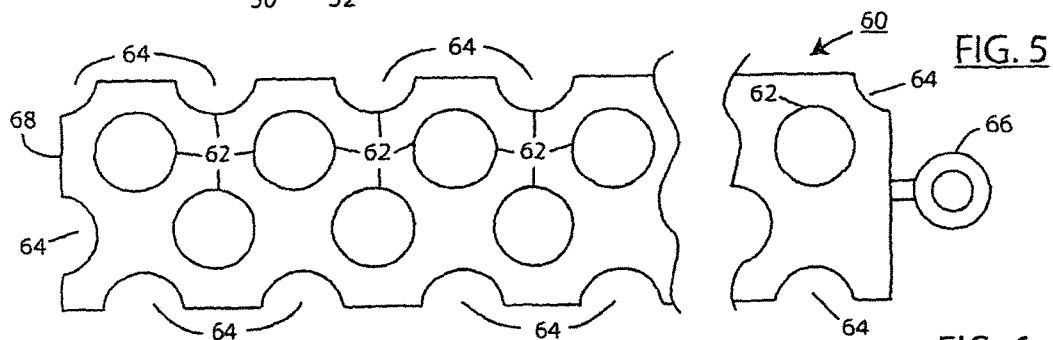
FIG. 5
FIG. 6
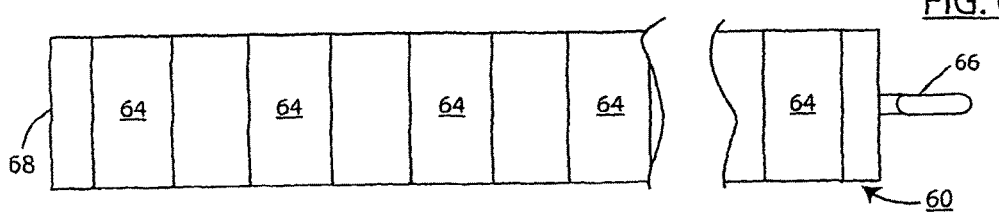
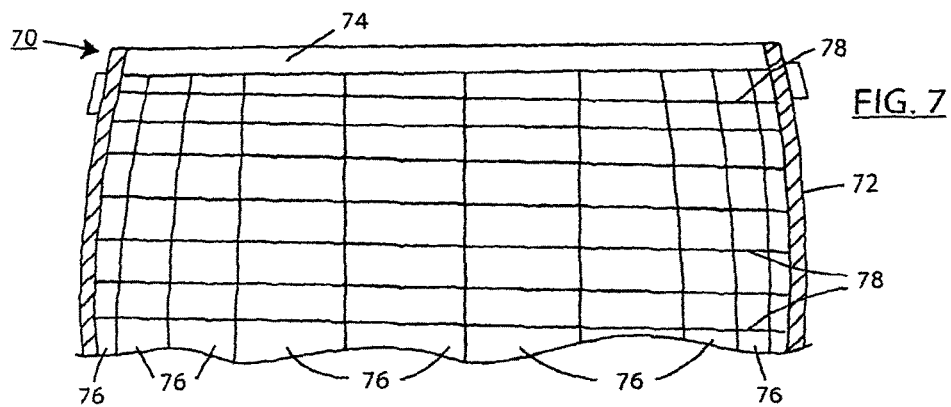
FIG. 7

US 10,260,032 B1

APPARATUS AND METHOD FOR AGING LIQUIDS

This invention relates to the aging of liquids such as wine, spirits, beer, and other liquids, syrups, and the like, whose flavors are enhanced by aging in wood. Priority is claimed from U.S. Pat. No. 9,212,343 B1, filed Apr. 30, 2010, and application Ser. No. 13/065,944, filed Apr. 1, 2011.

Many proposals have been made in the past for aging liquids in wood. The main problem addressed by such prior proposals, and by this invention as well, is the very slow speed at which aging in oaken barrels takes place. Often, it takes years of aging to create a whiskey, wine, or other spirituous liquid with the right flavor characteristics. This is very expensive because of the capital tied up in barrels, storage space, and evaporation of the liquid.

Therefore, there have been many attempts to provide apparatus and methods to accelerate the aging process. In one prior approach, wood is cut into small cubes or shavings, etc. and placed in a bag or other porous container which then is inserted into the liquid. This requires cutting the wood, bagging it, and the cost of bags. It has other disadvantages which will be set forth below.

Other prior aging processes and apparatus include the formation of vertical grooves or indentations in the staves of a wooden barrel to increase the surface contact area of the barrel. This is believed to produce an only modest improvement, at best.

Other prior devices use structures such as wooden discs or spiral-cut wooden pieces to be inserted into the liquid to increase the wood surface area and accelerate aging.

Although some of the prior proposals have achieved some success, none has achieved the ultimate in aging speed, quality of the aged liquid, and cost-effectiveness.

Therefore, it is an object of the present invention to provide a liquid-aging apparatus and method which alleviates or overcomes the foregoing problems.

It is a further objective to provide a liquid-aging process and apparatus which age liquids rapidly and economically, while achieving good taste characteristics.

It is a further object of the invention to provide such apparatus and methods which are relatively simple and economical to manufacture and use.

In accordance with the present invention, a wooden member is provided inside a container for containing the liquid. The wooden member has a plurality of holes formed across the grain of the wood in a honeycomb pattern.

In such a pattern, the holes are arranged in rows and columns, with alternating rows being offset laterally from the adjacent rows. The holes are relatively close together with spacing between them of less than one diameter of the holes.

The wooden member can be provided in different forms.

One form is in one or more of the staves or panels making up a wooden barrel. The holes are drilled less than all the way through the staves so as to preserve the integrity of the barrel for holding liquids without leakage.

Another form for the wooden member is an elongated member or "stick" which can be inserted into an opening in a barrel or other container and suspended in the liquid in the container to provide aging. The stick can be attached to a bung cover for the bung hole in a barrel, or otherwise secured to the container to hold it in suspension in the liquid. If needed, multiple sticks can be connected together in series to increase the effective aging area of the wood in the liquid.

In addition, staves of the barrel and/or the wood sticks can be cut crosswise of the grain of the wood with multiple parallel cuts to expose more end grain of the wood to the liquid to further increase the rate of infusion of the liquid into the wood.

In an alternative embodiment of the invention, a wooden barrel is made, in the usual way, by bending staves and binding them at the top and bottom so as to produce a barrel with a midsection of larger diameter than at the ends. Then, a spiral groove is cut across the grain of the successive panels, on the inside of the barrel, so as to form, in effect, multiple cross-grain cuts in a continuous spiral form over a substantial height of the barrel's inner surface to provide enhanced aging.

When using the invention for aging liquids, the number of staves with holes in them needed in a wooden barrel to give a desired aging rate is determined, and barrels are then built with the number of such panels deemed to be needed to achieve the aging objectives.

The pitch and length of the spiral groove also can be selected to give the desired aging characteristics.

Similarly, the number and size of the aging sticks to be used is determined, and that number is inserted through the bung hole or opening in the aging container, the liquid is introduced into the container, and aging is allowed to proceed for a desired length of time.

The foregoing and other objects and advantages of the invention will be set forth in or apparent from the following specification and drawings.

IN THE DRAWINGS

FIG. 1 is a perspective view, taken from above, of a portion of a wooden barrel using the invention;

FIG. 2 is a cross-sectional, broken-away view, taken along line 2-2 of FIG. 1;

FIG. 3 is a cross-sectional, broken-away view taken along Line 3-3 of FIG. 1;

FIG. 4 is an enlarged side elevation view of a portion of one of the staves of the barrel shown in FIG. 1;

FIG. 5 is a top plan view, partially broken-away, of a wooden member used as an "aging stick" in another embodiment of the invention;

FIG. 6 is a side elevation view of the structure shown in FIG. 5; and

FIG. 7 is a broken-away cross-sectional view of a portion of a wooden barrel using another embodiment of the invention.

BARREL STAVE EMBODIMENT

FIG. 1 shows a portion of a wooden barrel 10 such as that commonly used for aging spirits, wine, beer, or the like. The barrel 10 has a plurality of vertical panels called "staves" 18, 20, 22, 24 and 26, forming a side wall 12.

A wooden bottom wall 14 is in position joining the bottom of the staves together, and a wooden top cover 15 fits into the groove 16 formed in the staves to close the barrel tightly at the top. There is a bung-hole (not shown), in the side wall 12.

The remaining staves, the top panel and hoops forming the complete barrel are not shown, for the purpose of clarity in the drawings.

Typically, the wooden barrel is made of white oak, which has the capability of storing liquids for long periods of time with little or no leakage, while also aging the liquids.

The inside surfaces of the staves normally are fairly smooth. However, in accordance with the invention, selected ones of the staves such as staves 20 and 24 are provided with arrays 30 of holes formed in the inner surfaces of the staves. The arrays of holes are used to enhance aging of liquid stored in the barrel.

Other staves such as staves 18, 22 and 26 do not have the holes in them, but instead have horizontal cross-grain grooves or cuts 28 to provide additional aging capability.

It should be understood that the arrays of holes 30 normally will extend the full length of each stave. However, only parts of the arrays have been shown in FIG. 1 so as to simplify the drawings.

It is not necessary to provide arrays which extend essentially the full length of the staves, because an array of holes of a shorter length may adequately serve the objectives of the invention.

Similarly, the array of horizontal cuts 28 need not extend the full length of the staves as shown in FIG. 1, if the added aging capability of a full-length array is not needed.

The holes in the arrays 30 are arranged in what is called a "honeycomb" pattern, which will be described in greater detail below.

As it is shown in FIG. 2, the holes such as the individual hole 31 in the stave 20 has a depth A which is substantially less than the full thickness E of the stave. Thus, substantial wood material is left to preserve the integrity of the barrel wall in retaining the liquid in it. In a white oak stave, the thickness E of the wood typically is around 1¼ inches and the depth A of the holes is about ⅝ of an inch, half of the stave thickness. Typically, the diameter D of the holes is around 3/16 of an inch, for staves of a standard size.

As shown in FIG. 3, the cross cuts 28 in the staves 22, and in the staves 18 and 26, extend substantially less than the full thickness of the staves so as to maintain adequate structural integrity. Typically, with staves whose thickness is 1¼ ", the depth B of each cut 28 is around ⅝", again, around half of the stave thickness. Preferably, the width C of the slot 28 is kept relatively small so as to minimize the amount of wood removed from the stave. Typically, the width C varies between approximately 0.05" and approximately 0.25". Preferably, the width C is approximately 0.10".

The vertical spacing Y (FIG. 1) between horizontal cuts 28 is sufficient to insure that the area of wood between adjacent cuts will not break off when the staves are bent to form the barrel. This distance has been found to be approximately ¾" or greater.

Hole Pattern

FIG. 4 shows an enlarged section of one of the staves 24 which has an array 30 of holes 34 which are arranged in a honeycomb pattern.

The holes 34 are arranged in parallel rows, 36, 38 and 40, spaced vertically by equal distances from one another, and aligned across the grain of the wood which runs vertically in FIGS. 1 through 4.

The holes 34 also are arranged in vertical columns 42-48, which also are spaced equally from one another.

Alternate rows, such as the row 38, are offset laterally from the holes in the adjacent rows 36 and 40. The columns of holes are spaced inwardly from the side edges of the staves 24 by a distance F, sufficient to prevent splintering.

The columns of holes are spaced midway between adjacent holes in each of the rows. The holes are spaced as closely together as possible without unduly weakening the wooden stave. To this end, the spacing G between adjacent holes is preferably kept below the diameter of each hole, and more preferably, less than one half of that diameter.

This "honeycomb" arrangement of the holes tends to increase the number of holes which can be positioned in a given surface area without fatally compromising the structural strength of the stave.

One of the large advantages of providing the holes in the stave is that it greatly increases the exposure of the end grain of the wood to the liquid in the container. It is believed that the liquid infuses into the wood in the end grain many times faster than it is absorbed into the side grain of the wood, which is formed by vertical xylem and phloem tubes which carry the nutrients and other liquids in the living tree. The end grain of the wood is well-exposed.

In order to maximize the absorption of liquid, the holes in adjacent vertical columns, such as columns 42, 43 and 44, are aligned vertically so that a vertical line 50 or 52 drawn through the left or right edge of each of the holes 34 is slightly overlapped by each of the holes. That is, each of the holes overlaps the vertical alignment line such as 50 or 52 by a small amount, say, 0.002" (two thousandths of an inch).

With this arrangement, a liquid in the container is absorbed into the wood sections between the holes very thoroughly in a relatively short amount of time. This greatly increases the infusion rate of the liquid into the wood and greatly increases the rate of aging.

Aging Stick

FIGS. 5 and 6 show an elongated wooden member 60 which is called an "aging stick." The wooden member 60 usually is much longer than shown in FIGS. 5 and 6, but is broken-away in order to fit the drawing into the available space.

Preferably, the maximum width dimension of the stick 60 is made small enough to enable the stick to fit through an opening in an aging container, into which it is to be inserted. Often, this is a bung hole in a barrel. Typically, the bung hole of a barrel has a diameter between 1⅛" and 2". Therefore, the maximum width dimension of the stick 60 will be a little less than 1⅛" or 2", depending upon the bung hole diameter through which it is to pass.

An eye-screw 66 is fastened in the right end of the stick 60 to enable it to be attached to a bung hole cover or other structure provided in the container for attaching it. Also, similar fasteners can be provided at the opposite end 68 to be used to attach the sticks 60 together end-to-end in a series arrangement, where more than one stick is needed.

The stick 60 has the same hole pattern as that shown in FIGS. 4 and 1, namely, a "honeycomb" pattern. The holes in the stick are shown at 62. Partial holes are shown at 64 on both edges and at the ends of the stick. These partial holes are formed by the manufacturing process used to make the sticks, in which a large panel has holes formed in it, and then the panels are cut parallel to the rows or columns or holes into square cross-section blocks such as that shown in FIGS. 5 and 6, with the cuts sometimes being made along center lines of rows of holes.

In this case, unlike that of the panels 20 and 24, of FIG. 1, the holes 62 are drilled completely through the wood of the member 60. This gives maximum exposure of the end grain of the wood in the holes to the liquid being aged.

Manufacturing Process

The holes 32 or 62 can be made accurately, in a relatively small amount of time, and at a relatively low cost.

For example, the holes can be formed by a programmed CNC machine with multiple router bits. The CNC machine is programmed to cut all of the holes in the accurate pattern shown in FIG. 4, either to the depth A shown in FIG. 2, or all the way through as shown in FIGS. 5 and 6.

The cuts 28 can be formed by multiple passes of radial arm or other saws, with either single or ganged saw blades.

Preferably, the holes 34 in the staves, shown in FIG. 1 are drilled, and the cuts 28 are made, before the staves are bent to form the barrel, that is, when the staves still are relatively straight pieces of wood. This greatly facilitates the automated formation of the holes and grooves.

The provision of the holes 34 and cuts 28 in the staves greatly increases the exposed end grain of the wood to greatly increase the absorption of liquid in the infusion process, without fatally reducing the strength of the staves.

In the process of finishing a barrel made using the present invention, the wood of the barrel (and of an aging stick, if desired) can be "toasted" or charred as needed or desired for the purpose at hand. Normally, wine barrels are toasted and barrels for aging spirits are charred.

An especially desirable character is given to the material of the barrel if it is first toasted, for say, about 45 minutes or so, at a relatively low temperature, to give the wood a light brown color, and then charred with a flame applied to it at a very high temperature for a very short time, so as to produce a two-step charred surface.

Helical Stave Cuts

FIG. 7 is a cross-sectional view of the top portion of a barrel which has been modified in accordance with another embodiment of the present invention. The barrel 70 has an upper edge 74, staves 76 bound together by hoops to form a side wall 72, and top and bottom walls (not shown).

In accordance with this further embodiment of the invention, one or more helical or spiral cross-grain cuts 78 are formed on the inner walls of the staves 76 completely around the inside of the barrel after the barrel has been assembled. This forms, in effect, a plurality of lands for each helical cut, which are formed by almost horizontal grooves in the staves. Each of the grooves exposes a significant amount of additional end grain to improve the aging of liquid contained in the barrel.

The helical groove or grooves 78 can be formed by hand, but preferably are formed by one or two circular saws on radial arms mounted on a central helical guide. The saws move on the helical guide upwardly and downwardly in the barrel, and the radial arm is spring-loaded to automatically change its effective length to accommodate the differing radii of the barrel at differing heights. The spring loading presses the saw blade(s) against the staves to make saw cuts forming helical grooves 78 with the right depth. Preferably, the grooves are of the depth and width like that of the grooves 28 formed in the staves 18, 22 and 26 of the barrel shown in FIG. 1, and as illustrated in FIG. 3.

Multiple different helical saw cuts can be made, and the vertical height of the helical grooves can be varied to produce a variable amount of acceleration of liquid infusion.

This method of producing extra end-grain exposure has the advantage that forming the cross-grain cuts after assembly of the barrel will largely prevent the breaking off of pieces of the inner surfaces of the staves when the staves are bent to form the barrel. This allows the lands of the groove 78 to be closer together than the cuts 28 shown in FIG. 1, if desired.

Method of Use

In using the invention, it is determined how fast the liquid is to be aged. Preferably, this is determined empirically by trial and error with each different kind of liquid to be aged. This is desirable to assure that the aging process does not proceed too quickly. This is therefore going to be a factor in determining the number of staves like the holed staves 20 and 24 shown in FIG. 1 to be used, and the characteristics of other staves which may have horizontal cuts, or the length and pitch of the helical groove 78 cut in the barrel shown in FIG. 7.

Then the barrel is made with the requisite number of hole-bearing, or cross-cut, or spiral-cut staves, and then the liquid to be aged is placed in the container and held for the requisite amount of time, with periodic testing to ensure good characteristics of the liquid.

Similarly, where aging sticks are used instead, or in addition to hole-bearing and groove-bearing staves, the number of sticks used in a given container is determined, and the proper number is inserted into liquid in the aging container, and held there for a desired length of time.

Although the aging stick 60 shown in FIGS. 5 and 6 can be made of the same wood (usually white oak) as the staves of the barrel, the wood can be any other type of wood desired to give a particular flavor, aroma, or other desirable characteristic to the liquid being aged. Thus, a combination of different flavors can be infused into the liquid using a combination of ordinarty staves, or holed or grooved staves and aging sticks.

The present invention has a number of different advantages. First, the total wood surface area available for absorbing and aging liquids is increased significantly, thus increasing the speed of aging.

Significantly, each of the holes or cuts in the wood produces an increase in the amount of wood end grain exposed to the liquid.

It is advantageous that small wood pieces need not be prepared, loaded into bags or other porous containers. Moreover, porous containers are not needed at all. This cuts down on labor and materials costs.

The use of the invention has the further advantage that the quality of the wood used for aging the liquid is readily apparent. The staves easily are visible and the wood in the aging sticks also is clearly visible. This is unlike bags of wood cubes and chips in which knots, sap wood or pith can be included, without the knowledge of the distiller, vintner or brewer, because they are hidden from view.

The use of the aging sticks makes it possible to add sticks to barrels or any other type of container desired, and makes it possible to supply large planks to fit into long stainless steel tanks, carboys, or other large containers.

Although the hole arrays and grooves have been described as being formed in the side walls of a wooden barrel, it should be understood that it is within the scope of the invention to form such holes and/or grooves in the wooden end panels of a wooden barrel, or another kind of a barrel with wooden ends or wooden internal structure. This can be done in addition to, or instead of, forming hole arrays or grooves in the staves of barrels.

The above description of the invention is intended to be illustrative and not limiting. Various changes or modifications in the embodiments described may occur to those skilled in the art. These can be made without departing from the spirit or scope of the invention.

The invention claimed is:

1. A method of aging liquids comprising
    a. providing a container for holding a liquid during an aging time period, said container having a side wall, a top wall and a bottom wall, said side wall being secured between said top wall and said bottom wall and forming a liquid-tight container, said side wall comprising a plurality of wood panels assembled together to form said side wall, said side wall having an inside surface contacting said liquid and an outside surface in contact with the atmosphere around said container, at least one of said wood panels having an array of cross grain cuts extending into said inside surface of but only part-way through said one wood panel, said cuts being spaced from one another and exposing a predetermined amount of end-grain wood to contact the liquid in said container, and b. placing and holding said liquid in said container in contact with said one wood panel for a time sufficient to age said liquid to a desired degree.

2. A method as in claim 1 in which said side wall has at least one other of said wooden wall panels with cross-grain cuts which provide another pre-determined amount of end-grain wood exposed to contact with said liquid in said container.

3. A method as in claim 2 including, prior to placing a liquid to be aged in said container, a step of heating said inside surface of said side-wall to perform a treatment that is selected from the group consisting of toasting, charring, and sequentially toasting and charring said inside surface.

4. A method as in claim 1 including a step of determining the number of said cross grain cuts needed in said one wood panel, and forming a number of said cross-grain cuts in said one wood panel before using it to form said side wall.

5. A method as in claim 1 in which said cross-grain cuts are substantially linear.

6. A method as in claim 1 in which said cross-grain cuts are holes formed in an array in which said holes are arranged in rows staggered laterally with respect to one another and in columns in which the holes in alternating ones of said rows are vertically aligned with one another.

7. A method of aging liquids comprising providing a container for holding a liquid during an aging time period, said container having a side wall, a top wall, and a bottom wall, said side wall having an inside surface positioned to contact said liquid and an outside surface in contact with the atmosphere around said container, said side wall being secured between said top wall and said bottom wall and forming a liquid-tight container, in which said side wall comprises a plurality of wood panels secured together side-by-side to form a round barrel, each of said panels having an inside surface and an outside surface, and a step of forming cross-grain cuts in said inside surfaces of said panels by cutting at least one circumferential groove in spiral form in said inside surface of said round wooden barrel after it has been fabricated, and placing and holding said liquid in said container in contact with said panels for a time sufficient to age said liquid to a desired degree.

8. A method as in claim 7 including a step of heating said inside surface to perform a treatment selected from the group consisting of toasting, charring, and sequentially toasting and charring said inside surface of said side wall.

* * * * *